Dec. 25, 1951 R. C. CURTIS 2,579,475

FACSIMILE SYSTEM FOR SIMULTANEOUS TRANSMISSION OF PLURALITY OF ELEMENTAL AREAS

Filed Sept. 25, 1946 2 SHEETS—SHEET 1

RICHARD C. CURTIS
*INVENTOR.*

BY Alfred W. Barber
ATTORNEY

Dec. 25, 1951 R. C. CURTIS 2,579,475
FACSIMILE SYSTEM FOR SIMULTANEOUS TRANSMISSION
OF PLURALITY OF ELEMENTAL AREAS
Filed Sept. 25, 1946 2 SHEETS—SHEET 2

RICHARD C. CURTIS
INVENTOR.
BY Alfred W. Barber
ATTORNEY

Patented Dec. 25, 1951

2,579,475

UNITED STATES PATENT OFFICE 2,579,475

FACSIMILE SYSTEM FOR SIMULTANEOUS TRANSMISSION OF PLURALITY OF ELEMENTAL AREAS

Richard C. Curtis, Short Hills, N. J., assignor to Faximile, Inc., New York, N. Y., a corporation of Delaware Application September 25, 1946, Serial No. 699,170

5 Claims. (Cl. 178—6.6)

The present invention concerns electrical facsimile systems and, in particular, high speed pick up and recording systems.

One object of the present invention is to increase the speed of pick up and recording in a facsimile system.

Another object of the present invention is to provide increased recording speed without increasing the speed of certain moving parts, and without increasing the reaction speed of the recording medium. A particular object is to provide a facsimile recorder embodying helical and linear electrodes particularly adapted to electrolytic facsimile recording in which the speed of transmission and recording is increased without increasing the linear speed of the moving helical electrode.

Graphic copy to be reproduced by facsimile method is scanned point by point and density variations in the subject copy are reproduced on a receiving copy sheet. Usually a scanning point is moved across the sheet from side to side as the sheet is advanced at a slow rate to provide complete scanning of the copy. One convenient way in which this can be accomplished is to pick up the graphic original copy from a scanning drum, which rotates, by means of a pick up device which moves slowly parallel to the axis of the drum and to reproduce the copy by means of a helical electrode mounted on a rotating drum which forms a scanning point by intersecting a linear fixed electrode parallel to the axis of the drum between which electrodes a receiving copy sheet is moved at an appropriate rate of speed. The helical and linear electrode type of system has been found to be particularly useful in recording upon electrolytic recording paper. The helical electrode rotating under the recording sheet and pressing it against the linear electrode causes a certain amount of abrasion of the recording sheet. As the speed of recording is increased this abrasion increases proportional to some power greater than unity until a point is reached where it becomes impractical to further increase the speed due to the inability of the recording sheet to stand up under it. Also the marking of an electrolytic sheet at full density limits the recording speed in conventional systems since the chemical reaction in the sheet becomes incomplete above certain maximum marking speeds. According to the present invention if two or more helical electrodes are utilized to accomplish the scanning and they are rotated at the same rate of speed as the original one electrode was rotated, the rate of recording may be increased in proportion to the number of helical electrodes. In this way the rate of scanning may be increased two, three or more times without greatly increasing the abrasion of the paper sheet and without increasing the speed of marking at any one point.

Briefly, if it is desired to increase the recording speed four times, for instance, a drum carrying four helices is utilized. Each helix is displaced from the next by 90 degrees around the periphery of the drum. The recording sheet is advanced at four times its normal rate. The drum is rotated at the same speed at which it would be rotated if it carried only one helix but four lines are being recorded simultaneously and the speed of recording is four times normal. Since each helix operates at the same speed that a single helix would operate the abrasion of the recording sheet is only increased in proportion to the number of helices and the lineal marking rate is not increased although the speed of recording is multiplied by a factor of four.

In order to generate signals suitable for this recording system four recording heads are utilized on the pick up scanner each displaced 90 degrees around the periphery of the pick up drum. These pick up heads are located in a single plane. Further details and other objects of the present invention will be apparent from the detailed description of the invention taken in connection with the various figures of the drawing.

Figures 1, 2:
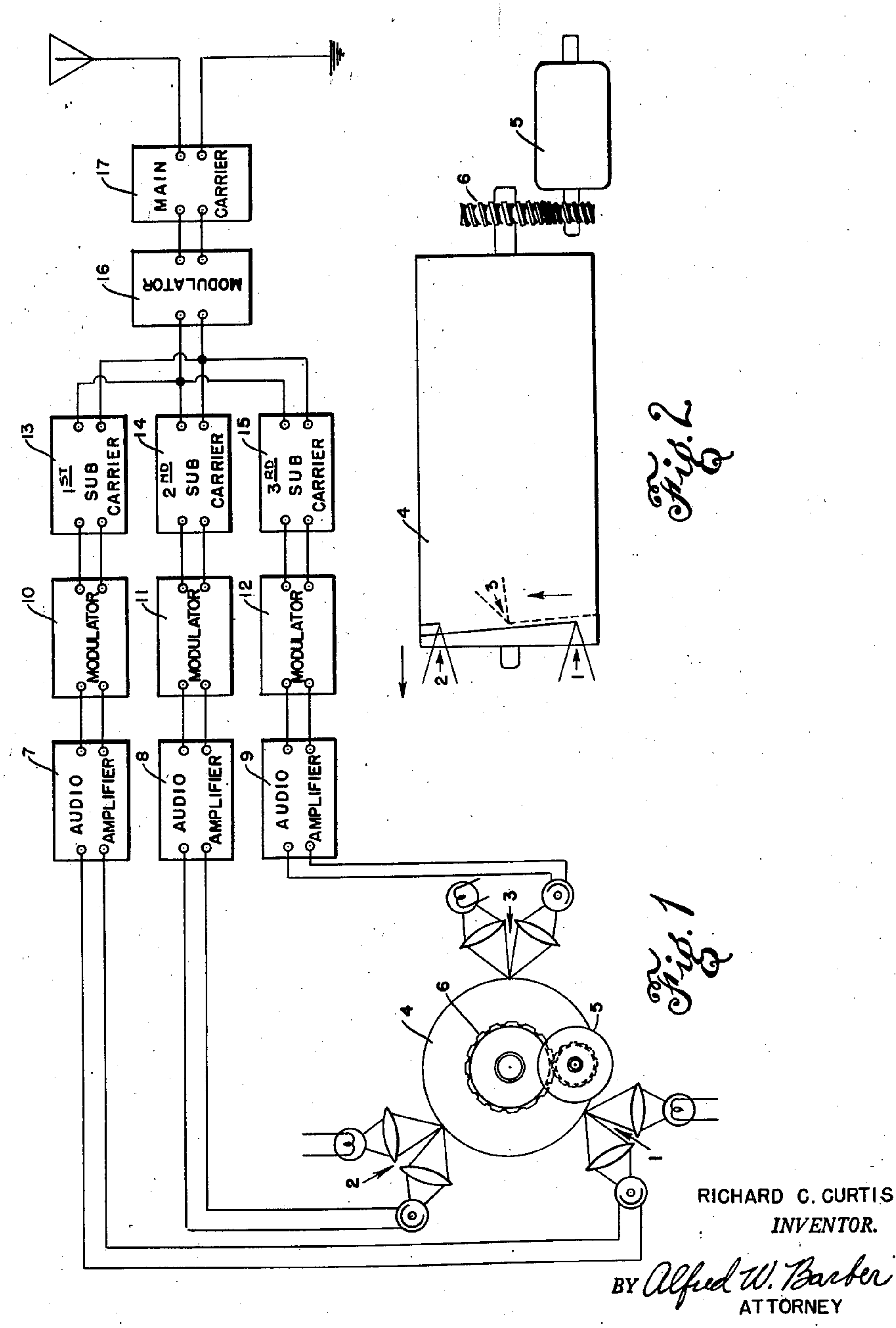
Fig.1 shows a pick up scanner employing three pick up heads according to one form of the present invention.
Fig. 2 shows the side view of the scanning drum of Fig. 1.

Fig. 1 shows a pick up and transmitting system for facsimile signals designed to increase speed of recording three times over that which would be possible with a single pick up head. Three pick up devices 1, 2, and 3 are arranged 120 degrees apart around the surface of a pick up drum 4. Drum 4 is rotated at a predetermined rate of speed by means of motor 5 driving gear 6 attached to drum 4.

The three signals generated by pick up devices 1, 2, and 3 are fed to audio amplifiers 7, 8, and 9 respectively from which they are passed to modulators 10, 11, and 12 modulating 1st, 2nd, and 3rd sub-carriers produced by generators 13, 14, and 15. The three sub-carriers thus modulated with facsimile signals are combined in modulator 16 to modulate a main carrier generated by oscillator 17 which is radiated or transmitted in any conventional manner to a different point. Each of the scanning devices 1, 2, and 3 is located in a plane perpendicular to the axis of drum 4. All three scanning devices are advanced at three times the normal rate axially along the scanning drum so that the scanning process is completed at three times the normal rate of speed.

Fig. 2 indicates graphically the actual locations of scanner heads 1, 2, and 3 relative to their scanning lines and drum 4. When the pick up scanning system, as shown in Figs. 1 and 2 is operating three simultaneous multiplex signals are being transmitted each representing a point in a scanning line of copy displaced by 120 degrees around the periphery of the pick up drum. These three scanning heads are moved along the axis of the scanning drum by means, not shown, at three times the usual rate of speed and completely scan the copy in one third the time usually required.

Figure 3:
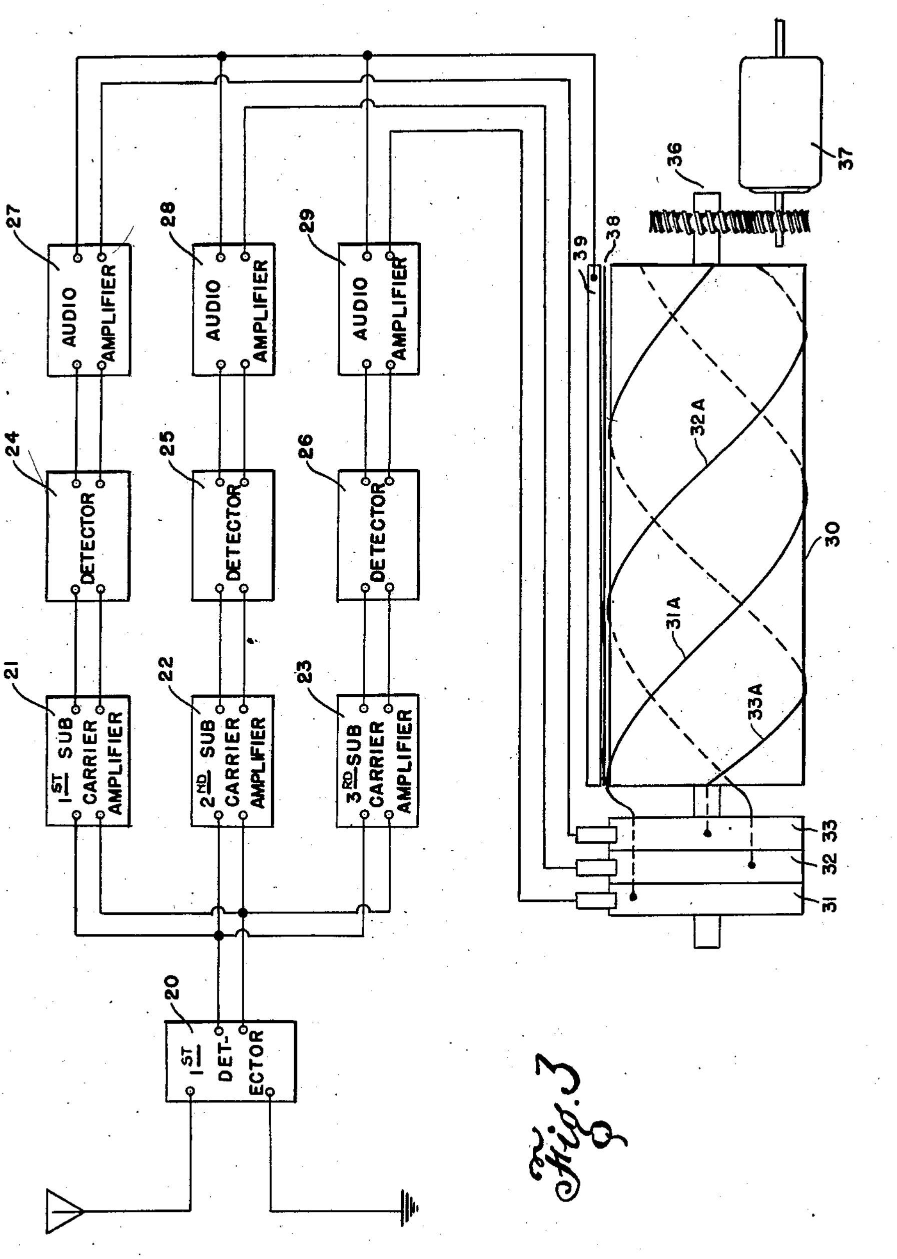
Fig. 3 shows a receiving and recording system which may be utilized in connection with the transmitting system of Fig. 1.

Fig. 3 shows a receiving and recording system for utilizing the signals generated and transmitted by the system of Figs. 1 and 2. The transmitted signals may be utilized in a number of ways which will be apparent to one skilled in the art as for instance by feeding them through a first detector 20, which includes means for separating the signals on a sub-carrier frequency basis, feeding them to three separate channels, one channel including first sub-carrier amplifier 21, detector 24 and audio amplifier 27; the second channel including second sub-carrier amplifier 22, detector 25 and audio amplifier 28; and the third channel including third sub-carrier amplifier 23, detector 26, and audio amplifier 29. The three signals now appearing in the output of audio amplifiers 27, 28, and 29 represent the three signals originally picked up by scanner heads 1, 2, and 3 of Figs. 1 and 2. These output signals are applied to slip rings 33, 32, and 31, mounted on the shaft of helix drum 30. Helix drum 30 carries three helical electrodes 33A, 32A, and 31A, each displaced around the drum by 120 degrees and connected electrically to slip rings 33, 32, and 31 respectively. Drum 30 is rotated at the same rate of speed as drum 4 of Fig. 1 by means of a suitable motor 37 and gear system mounted on shaft 36. Linear electrode 39, mounted parallel to the axis of drum 30, and pressing the recording sheet 38 against the helices forms the other pole of the output electrical system from amplifiers 27, 28, and 29. Signals causing current to pass from linear electrode 39 to the helices 31A, 32A, and 33A, cause density variation at the points of intersection upon sheet 39 to reproduce the facsimile copy. The recording sheet 38 is advanced at three times the rate of speed at which it would be advanced if there were only one helical employed by means well known in the art but not shown here. In this way the facsimile copy is reproduced at three times the rate of speed with which it would be reproduced by a single helix rotated at the same rate of speed. This is accomplished since three signals are being utilized simultaneously. It will also be seen that since each helix rotates at the same rate of speed as it would rotate were only one employed that the abrasion of the recording sheet 38 is not increased while the rate of recording is multiplied three times. Also the required speed of the chemical reaction at the recording points is not increased.

It will be evident to those skilled in the art that while the present system has been described particularly in connection with three pick up devices and three helices giving three times the normal rate of transmission and recording that it is not limited to any particular factor of speed increase since more or less scanning heads and helices may be utilized in the same manner. While only this single embodiment has been shown and described many variations will be apparent to those skilled in the art and within the spirit and scope of the invention as set forth in the appended claims.

What is claimed is:

1. In a facsimile scanning device the combination of, a rotatable copy holder for holding copy to be scanned, at least two pick-up devices each including at least a source of illumination, a photoelectric cell and a lens system for scanning said copy at at least two points around said holder separated by an angle equal to 360 degrees divided by the number of pick-up devices.

2. In a facsimile recorder, the combination of, a rotatable drum, a linear recording electrode longitudinally parallel to the axis of said drum, at least two helical electrodes carried by said drum for cooperating with said linear electrode to simultaneously record at at least two points upon a recording sheet disposed between said linear and helical electrodes, and means for applying separate marking signals to said helical electrodes.

3. In a facsimile recorder, the combination of, a rotatable drum, a linear recording electrode longitudinally parallel to the axis of said drum, at least two helical electrodes carried by said drum and dividing said drum into substantially equal portions for cooperating with said linear electrode to simultaneously record at at least two points upon a recording sheet disposed between said linear and helical electrodes, and means for applying separate marking signals to said helical electrodes.

4. In a facsimile scanner and recorder system of the type wherein a plurality of lines across the copy are simultaneously scanned point-by-point, the points of each line being displaced from each other in the direction of scan; a recorder comprising: a number of coaxial substantially single-turn rotatable helical recording electrodes equal to the number of lines simultaneously scanned, each electrode being insulated from the others, and a linear electrode parallel with the axis of said helical electrodes and disposed to define simultaneous marking points by its intersection with all the helical electrodes, the coaxial helical electrodes being angularly displaced from each other by amounts such that the points intersected by the linear electrode are displaced in conformity with the scanned points.

5. In a facsimile system, a scanner and cooperative recorder comprising: a rotatable cylindrical copy holder for holding copy to be scanned; a plurality of pick-up devices disposed circumferentially around the holder and separated by predetermined angles; an equal plurality of single-turn helical recording electrodes angularly displaced by the same predetermined angles on a common axis, each helical electrode being receptive to a signal from a corresponding one of said pick-up devices; and a linear recording electrode disposed parallel with the axis of said helical electrodes for cooperation therewith in defining an equal plurality of simultaneous marking points.

RICHARD C. CURTIS.

REFERENCES CITED

The following references are of record in the file of this patent:

UNITED STATES PATENTS

| Number | Name | Date |
|---|---|---|
| 1,751,584 | Hansell | Mar. 25, 1930 |
| 1,775,241 | Horton | Sept. 9, 1930 |
| 1,854,315 | Schmook | Apr. 19, 1932 |
| 1,938,990 | Woodward | Dec. 12, 1933 |
| 2,131,741 | Kleinschmidt et al. | Oct. 4, 1938 |
| 2,291,476 | Kernkamp | July 28, 1942 |
| 2,370,160 | Hansell | Feb. 27, 1945 |

FOREIGN PATENTS

| Number | Country | Date |
|---|---|---|
| 513,371 | Great Britain | Oct. 11, 1939 |